United States Patent [19]

Cuervo

[11] Patent Number: 5,025,138
[45] Date of Patent: * Jun. 18, 1991

[54] METHOD AND SYSTEM FOR PROVIDING VERIFIABLE LINE OF CREDIT INFORMATION

[76] Inventor: Vincent Cuervo, 4251 Aurora St., Coral Gables, Fla. 33146

[*] Notice: The portion of the term of this patent subsequent to Jan. 5, 2006 has been disclaimed.

[21] Appl. No.: 141,150

[22] Filed: Jan. 6, 1987

Related U.S. Application Data

[63] Continuation-in-part of Ser. No. 739,690, May 31, 1985, Pat. No. 4,718,009, which is a continuation-in-part of Ser. No. 583,591, Feb. 27, 1984, abandoned.

[51] Int. Cl.$^5$ .............................................. G06F 15/30
[52] U.S. Cl. .................................. 235/379; 364/225.2; 364/227.3; 364/408
[58] Field of Search ...................... 235/379, 380, 381; 364/225.2, 227.3, 408

[56] References Cited

U.S. PATENT DOCUMENTS 3,949,191 4/1976 Crowther ............................ 235/380
4,194,242 3/1980 Robbins ............................... 364/200
4,346,442 8/1982 Musmanno .......................... 364/408
4,376,978 3/1983 Musmanno .......................... 364/408
4,454,414 6/1984 Benton ................................ 235/381
4,590,365 5/1986 Okada ................................. 235/379

Primary Examiner—Benjamin R. Fuller
Assistant Examiner—Scott A. Rogers
Attorney, Agent, or Firm—Malin, Haley, McHale, DiMaggio & Crosby

[57] ABSTRACT

A method and system for providing line of credit information to participating banks that issue debit cards to owners of life insurance policies, wherein the cash surrender value of the life insurance policy has been assigned as collateral to secure the credit line on the individual's (policy holder's) debit card. The basis of this invention is the appreciation of the uniqueness in the collateral of the cash surrender value of a life insurance policy and the manner in which such collateral can be used to expedite the issuance and surveillance of debit card accounts. The system of this invention, (also hereinafter "assignee") provides line of credit information to participating debit card issuers and periodically monitors the line of credit for each of debit card holder whose line of credit is secured by the cash surrender value of his insurance policy. The manner of securing this line of credit effectively eliminates potential losses from default on such credit obligation.

8 Claims, 1 Drawing Sheet

METHOD AND SYSTEM FOR PROVIDING VERIFIABLE LINE OF CREDIT INFORMATION

CROSS REFERENCE TO RELATED APPLICATION

This application is a continuation-in-part of co-pending application Ser. No. 739,690, filed May 31, 1985, (now U.S. Pat. No. 4,718,009), which in turn was a continuation-in-part of Ser. No. 583,591, filed Feb. 27, 1984 (now abandoned).

BACKGROUND OF THE INVENTION

1. Field of the Invention

This invention relates to a method and to a system. More specifically, this invention is directed to a unique method of providing line of credit information to participating issuers of debit cards; and, to a system for the collection, management and periodic updating of such line of credit information. The line of credit information is based upon the cash surrender value of life insurance policies which have been assigned to the system to establish and secure the line of credit.

2. Description of the Prior Art

The collateralization of credit for various types of consumer transactions is not a new nor a risk free undertaking. Typically, such transactions have involved the vendor taking back a purchase money security interest in the goods sold to a customer. The collateralization of the debit is, thus, based upon creditor's belief and hope that if the debtors defaults, he can recover the merchandise and thereafter resell it (as used) to cover the default by the original purchaser. When the amount recovered from resale of the repossessed property is inadequate to cover the balance upon the original debit, the creditor must sue the debtor for the deficiency. In order to be fully protected in the collateralization of his purchase money security interest, the creditor must perfect such interest with the appropriate UCC filings. In order to avoid the problems inherent in this process, the vendors and merchants have attempted to shift the risk of collection of the unpaid balance of a consumer purchase to the various credit card companies. This process simply involves an agreement between the merchant and the credit card user which allows the merchant to accept the credit card in lieu of cash and the credit card issuer to collect the unpaid balances from the purchaser/card holder. The credit card issuer derives revenue from this process by discounting the amount paid to the merchant for the consumer purchase and by charging the credit card user (purchaser) interest on the unpaid balance. In addition, many of the credit card issuers charge the card holder an annual fee. The typical credit line on a credit card is based upon a credit information supplied to issuer by a credit card applicant. The credit line on such cards is generally unsecured. Where the credit card holder defaults upon his obligation to the card issuer, the card issuer is required to turn the delinquent debit over for collection or pursue collection efforts itself.

Collateralization of the extension of credit in the securities field is a relatively well established practice. More specifically, the securities in a client account can be used to secure the purchase of the additional securities; or, the newly purchased securities themselves serve as collateral for the loan. In each of these instances, the amount of credit extended to the client is limited by the credit requirements of the individual brokerage house and the Securities and Exchange Commission. Where the value of the pledged securities, or the securities purchased on margin, falls below permissible limits, the client/debtor, need supply additional collateral or sell the pledged collateral to cover his obligation. As is evident, the value of securities pledged collateral is subject to market forces which cannot be readily predicted. Where the fall in the value of the securities is severe, the collateral may be inadequate to cover the amount of the debt. Accordingly, the security industry must scrupulously monitor the value of the pledged collateral, and be prepared to liquidate its client's position in a particular stock where the margin requirements are exceeded. This forced liquidation has the unintended consequence of further depressing the value of the security in other firm client's portfolios. At least one brokerage house (Merrill, Lynch, Pierce Fenner & Smith), and possible others, monitor client portfolio values with a proprietary software program. U.S. Pat. Nos. 4,376,978 and 4,346,442 (both issued to Musmanno). The Musmanno patents describe what has become known in the industry by the phrase "Cash Management Account". One of the facets of this management system is to continuously monitor the value of client securities purchased on margin: Where the amount of credit exceeds the permissible margin requirements, the client must pledge additional collateral or the security can be sold. If the client has liquid assets in his account, (i.e. "Ready Assets"), funds from this liquid account can presumably be used, with prior authorization, to cover any shortfall in the collateral requirements, thereby avoiding a forced sale of the security in a declining market.

More recently, banks have promoted lines of credit secured by equity in real estate. These so called "equity credit lines" are based upon the present value of the property, the amount of current unpaid mortgage and the credit worthiness of the property owner. The collateral used to secure the equity credit line is subject to market fluctuations in real estate values and still requires a formal collection process in the event of default. Thus, even though the lender is secured, the collateral is not liquid and can fluctuate in value depending upon market conditions.

The lack of liquidity of collateral posses a substantial problem were, for example, the market for this collateral (i.e. real estate) is severely depressed. In addition, the administration of the system necessary to support a collateral secured lender can be both cumbersome, unwielding and expensive.

One proposed solution for this dilemma is to substitute a more liquid form of collateral for the traditional security. This has resulted in the relatively recent introduction of the debit-card. These so-called "debit-card" accounts have been offered as an alternative to the more traditional charge cards as a means for expediting the collection process and providing enhanced liquidity to secure the consumer's credit line. This type of account, simply authorizes vendor, through this issuer of the debit card, to transfer or debit funds from the bank account (i.e. checking or savings account) of the purchaser and deposit them in an account of the vendor. The issuer of the debit card would exact a fee for effecting such transfer.

As of the present, such devices have not proven to be very attractive. While the collection process is expedited, the debit card simply shifts the responsibility onto the consumer to keep the debit account adequately funded. It does not guarantee such adequate finding nor does it provide collateral for changes which are in excess of the funds in such account.

More recently, a unique system (hereinafter "Default Proof Credit Card System") has been developed, which is being marketed to credit card issuer that would simplify the credit application process and reduce its associated costs; provide verifiable line of credit information on qualified card applicants; and, collateralize the line of credit of the card holder with a source of liquid asset (Cuervo U.S. Pat. No. 4,718,009). The Cuervo patent describes a system for providing verifiable credit information to participants banks; and collateralize the charges made by credit card holder up to the verifiable line of credit based upon the cash surrender value of card holder of life insurance policy, which has been pre-assigned to the system. This form of collateral is unique in a number of respects; the most significant difference being that it is not subjected to the fluctuation in value associated with the securities and real estate (the two more popular forms of collateral in use today) since its value is actuarially determined. In addition, the Cuervo system provides the means for automatically increasing the line of credit of the credit card holder as the cash surrender value of the life insurance policy increases. As originally conceived, the Cuervo invention contemplated collateralization of credit and charge accounts with the cash surrender value of life insurance policies of card holders. This concept is, however, clearly applicable to virtually any credit/qualification/ collection/clearing environment in which the amount of credit extended is based primarily upon the debtor's ability to repay the loan; and, the collateralization of the transaction a secondary consideration because of the dollar amount of each individual transaction and the shear number of such transaction which are processed for each account. No one system has up to now been able to accommodate the competing needs of merchants of goods and services, the consumers of such goods and services and the financial institutions who traditionally have served as an intermediary in the collection process. Where an alternate has been offered to present credit/charge card system, for example "debit cards", both the consumer and the financial institutions, offering such arrangements, have been less than totally satisfied with the result.

OBJECTS OF THE INVENTION

Accordingly, it is the object of this invention to provide a remedy the deficiencies in the prior art.

More specifically, it is the principle object to provide a system for providing readily verifiable line of credit information to participating lenders without the tranditional qualification and investigation of the credit applicant.

It is another object of this invention to provide a system for automatically updating verifiable credit information of a debtor of a participating lender.

If is yet another object of this invention to than provide a system to collateralize the credit extended to a debtor by participating lenders to the full extent of the line of credit for a given participating lender.

It is still yet another object of this invention to provide a method for communicating line of credit information to participating lenders which alerts them to incremental increases in the value of the collateral which secures a credit line of a debtor.

SUMMARY OF THE INVENTION

The above and related objects are achieved by providing a method and a system for providing readily verifiable line of credit information to participating banks based upon the current cash surrender value of a debtors' life insurance policy(s). The cash surrender value of the policy(s) is used to both qualify the individual as creditworthy and to collateralize the amount of credit which is extended by the participating lending institution. In the context of this invention, the debtor (also hereinafter referred to as "cardholder" or "debit cardholder") is qualified as creditworthy based upon the amount of collateral which is available, based upon the cash surrender value of his life insurance policies. Other insurance vehicles can also be used to provide analogous collateralization of a line of credit for the cardholder, provided the collateral is similarly free from downward fluctuation in cash surrender valve and its value can be actuarially determined. In the preferred embodiments of this invention, the individual desiring to qualify for this form of secured credit, would simply assign the cash surrender value of his life insurance policy to an independent credit clearing house (hereinafter the "system" or "credit line computation system") or to the entity issuing the line of credit. In for example, a debit-card account, the amount of collateral available to secure the credit transaction would be enhanced by the amount of the cash surrender value of the policies of the cardholder. Accordingly, if the source of repayment of funds (i.e. the debited account) is inadequate, the creditor is no longer at risk of default of repayment, since the amount of debt in excess of the debited account is collateralized by the prior assignment/pledge of the cash surrender value of the cardholder.

This invention also includes a method for the computation of the available line of credit for a debit card account, based upon the available cash surrender value of the qualified debit card holder; and, for the automatic updating of the amount of the line of credit based upon increases in the cash surrender value of the qualified cardholder's insurance policies.

DESCRIPTION OF THE INVENTION INCLUDING PREFERRED EMBODIMENTS

Figure 1:
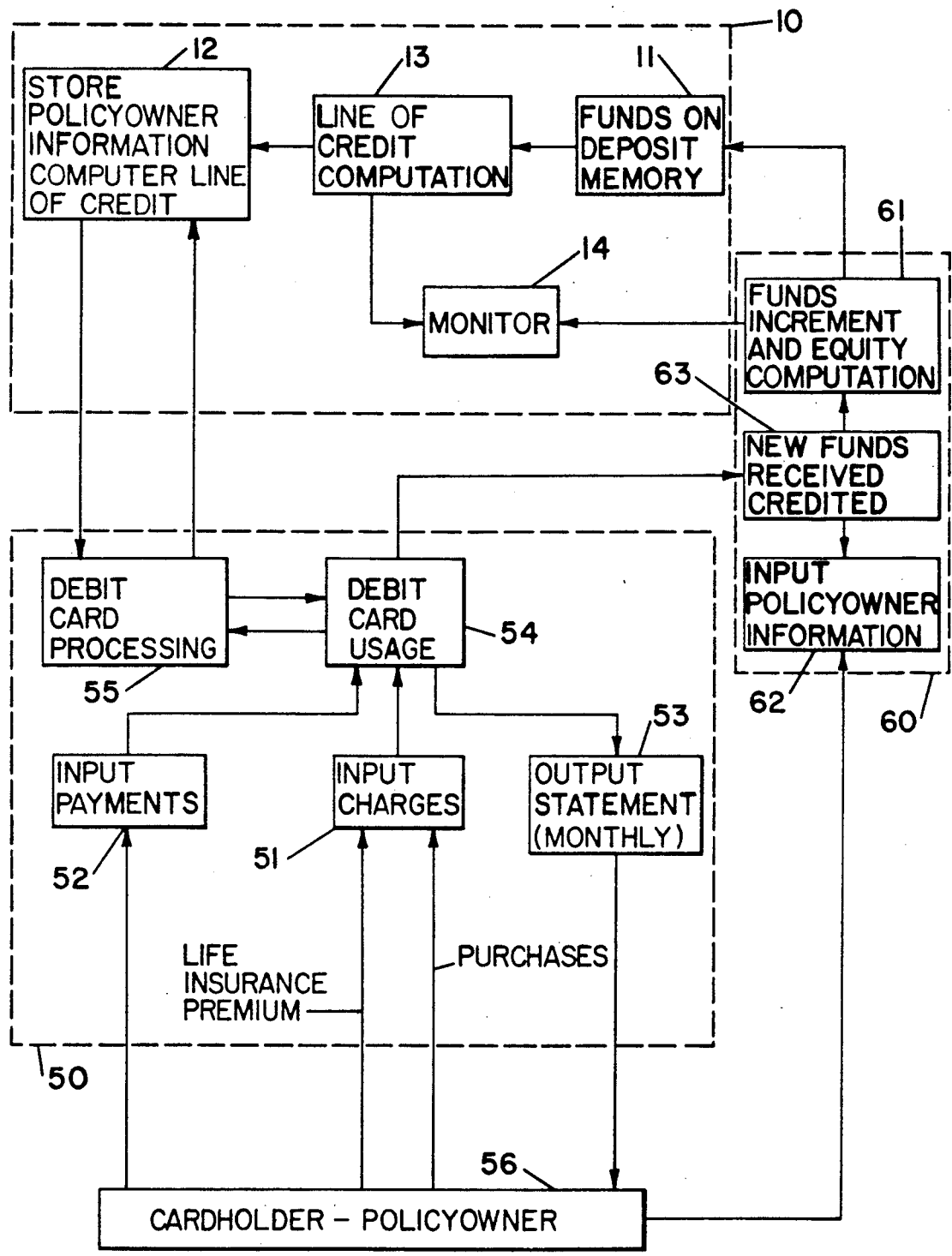
FIG. 1 is a block diagram of the preferred system for providing accurate and verifiable line of credit information to participating debit card issuers.

Referring now to FIG. 1, the default-proof debit card system can be depicted as modular component of an integrated system or as a stand-alone entity (10). Basically, credit line computation system (10) will be offered to banking institutions (50) already licensed or franchised to issue bank debit cards so that its cardholders may use the equity in their insurance policies as collateral. For the purpose of this application the term "cardholder" and "policyholder" are interchangeable.

The information on each individual participating in the system is stored on: funds on deposit memory bank (11) which can be a conventional random and/or sequentially access memory device. This credit information includes the number of policies pledged (assigned to the system) and each policy's cash value, dividends, accumulated dividends and/or paid up dividend addition cash value. This information is fed to an information processor (13) periodically so that the line of credit for each policyholder/cardholder can be computed. The policyholder memory bank (12) will contain information regarding the individual policy owner and the periodically updated line of credit computed.

The system (10) is linked to participating insurance companies (60) (only one being shown in FIG. 1) and to authorized bank credit card issuing entities (50).

A participating cardholder assigns the rights to the equity in his or her insurance policy or policies to the benefit of the system (10) through an equity assignment form. The system (10) obtains enough regarding his policy either directly or by authorizing his or her insurance carrier (60) to do so. The insurance carrier (60) periodically informs the system (10) through a data link processor (61) as to relative equity position of the participating policyholders. This process of equity computation can vary depending upon the provisions of each policy which are set by the respective carrier. The policyholder (56) continues its business relationship with carrier (60) which continues to administer the provisions of the assigned policies and/or enters into new contractual provisions with him or her. For example, the policy may be changed, namely, the beneficiaries changed, etc. The carrier (60) will continue to conduct business as usual, with the exception of the troublesome extension of loans and the collection thereof, which now is coordinated by the system (10), and, easily made available to the policyholder via a bank debit card at relatively low cost. Policyholder (56) has the choice of either paying the insurance premium directly to carrier (60) or charging it automatically to the debit card. The bank (50) receives its cardholder's charges and payments through the traditional input charges systems (51, 52) which generate a monthly billing statement (53) in a conventional fashion. The debit card usage is computed in bank's processor system (54) which compares it with the line of credit approved by the system (10) The bank (50) is assured that the system (10) will cover card expenditures in excess of the source of repayment of funds, for up to the amount of line of credit which more than likely will be raised as additional insurance premiums are paid and the cash surrender value of the assigned policies increase. This eliminates the need of engaging in credit history applications and checking, which are both time consuming activities and augment the overhead of the operation, and consequently, the interest rates charged to the cardholders may be lowered.

The system (10) will receive compensation from the participating banks (50) in any manner that is suitable depending on the economic circumstances. For example, it may charge a fixed fee for each card issued by the bank, or a charge may be assessed proportional to the transaction activities of the cardholder, etc.

The foregoing description has been provided as illustrative of some of the preferred embodiments of the present invention. Variations of these embodiments may be made without departing from the spirit and scope of the inventive concepts of this invention.

What is claimed is:

1. A method for providing line of credit information to participating banks that issue debit cards to owners of life insurance policies, wherein the cash surrender value of said life insurance policies has been assigned to a system, selected from the group consisting of a credit clearing house or a lender, which provides credit information to said participating bank, by said policy owner, to secure a line of credit to the owner of the life insurance policies in excess of the debited account, comprising the steps of:
   A. providing a system for storing and periodically updating the cash surrender values of the assigned life insurance policies in a computer memory;
   B. computing said line of credit for a debit card holder based on said cash surrender values stored for each policy owner;
   C. transmitting said line of credit information from said system to participating banks; and
   D. monitoring periodically the assigned life insurance policies with said system for any incremental increase of said cash surrender values so that the line of credit for the debit card holder may be automatically upgraded.

2. The method set forth in claim 1, wherein said step of computing the line of credit is done with a general purpose computer and said step of transmitting said line of credit is done through modem means connected through a telephone network to said participating banks.

3. A system for providing line of credit information to participating banks that issue debit cards to owners of life insurance policies wherein the cash surrender value of said life insurance policies have been assigned to said system, which provides credit information to participating banks, by said owners to secure the debit card line of credit to the owner of the life insurance policies, comprising
   A. memory means for storing and periodically updating said cash surrender values of assigned life insurance policies;
   B. means for computing said line of credit from said stored cash surrender values of the assigned insurance policies according to a pre-determined formula;
   C. means for transmitting said computed line of credit information from said system to said participating banks; and
   D. means for periodically monitoring the assigned life insurance policies for any incremental increase of said cash surrender value so that the line of credit of the debit card holder may be automatically upgraded in said system.

4. The system set forth in claim 3, wherein said means for computing includes a general purpose computer and said means for transmitting includes modem means connected to said participating banks through a telephone network.

5. A method for computing line of credit information, as a basis for a lending institution extending credit to an individual based upon charge, credit and/or debit card purchases, wherein the amount of credit is further collateralized by a separate account in the lending institution, the improvement comprising:
   providing a system having an assignment of the cash surrender value of the individual's life insurance policy; and
   collateralizing the line of credit extended to such individual by the lending institution with the individual's assignment of the cash surrender value of his life insurance policy to said system.

6. A method for collateralization of a line of credit to secure a lender against default by a debtor, wherein said line of credit is secured by a pledge or assignment of property of the debtor, the improvement comprising:
   A. obtaining from an applicant for credit, prior to extending credit, an assignment of cash surrender value from one or more insurance policies of said applicant, in favor of the lender, said assignment of cash surrender value being sufficient to secure the line of credit extended to said applicant.

B. monitoring the assigned insurance policies for verification of line of credit information.

7. The improvement of claim 6, wherein, the line of credit which is secured by the cash surrender value from the assigned life insurance policy is selected from the group consisting of the line of credit of a debit card and a credit card.

8. A method for securing a line of credit on a credit card or a debit card with the cash surrender value from insurance policies, said method comprising:

(A) providing means for storing and periodically updating information on insurance policies which have been assigned to secure a line of credit on a credit card or a line of credit for an overdraft on a debit card account;

(B) computing said line of credit for said credit card or debit card based upon the cash surrender value for each insurance policy owner;

(C) communicating said line of credit information to an entity issuing the line of credit on said credit or debit card; and, (D) monitoring the assigned insurance policies for verification of line of credit information.

* * * * *